United States Patent [19]
Fukuyama

[11] Patent Number: 6,036,987
[45] Date of Patent: Mar. 14, 2000

[54] PROCESS FOR PRODUCING QUICK-BOILING PASTAS AND NOODLES

[75] Inventor: Teruyasu Fukuyama, Kagoshima-ken, Japan

[73] Assignee: Feed Up Inc., Kagoshima-ken, Japan

[21] Appl. No.: 09/093,391

[22] Filed: Jun. 9, 1998

[30] Foreign Application Priority Data

Jun. 11, 1997 [JP] Japan ................................. 9-153229

[51] Int. Cl.[7] .............................. B65B 55/00; A21D 6/00
[52] U.S. Cl. ......................... 426/402; 426/128; 426/496; 426/549; 426/557
[58] Field of Search ................................... 426/496, 549, 426/557, 402, 128

[56] References Cited

U.S. PATENT DOCUMENTS

| | | | |
|---|---|---|---|
| 4,368,210 | 1/1983 | Murakami et al. | 426/557 |
| 4,529,609 | 7/1985 | Gaehring et al. | 426/532 |
| 4,539,214 | 9/1985 | Winter et al. | 426/557 |
| 4,783,339 | 11/1988 | Horner | 426/557 |
| 5,063,072 | 11/1991 | Gillmore et al. | 426/557 |
| 5,397,587 | 3/1995 | Thompson et al. | 426/557 |
| 5,573,804 | 11/1996 | Hsu | 426/496 |
| 5,728,418 | 3/1998 | Hauser et al. | 426/557 |

*Primary Examiner*—Nina Bhat
*Attorney, Agent, or Firm*—Browdy and Neimark

[57] ABSTRACT

Dry pastas or noodles are heated with wet heat for a short time so that only their surface layer portion is converted to the α-starch; the pastas or noodles are then cooled, dried to remove the surface moisture, immersed in water to have it absorbed and subsequently cooled for a short time. Alternatively, the pastas or noodles that have been dried on the surface are put into a sealable container such as a plastic bag together with a specified amount of water and, thereafter, the container is sealed and the absorption of water is completed during storage or transport of the pastas or noodles. Pastas such as spaghetti and macaroni or noodles such as udon, soba and Chinese noodles can be cooked by boiling for a very short time and yet they develop same texture as can be attained by fully boiling dry or raw pastas or noodles.

10 Claims, No Drawings

PROCESS FOR PRODUCING QUICK-BOILING PASTAS AND NOODLES

FIELD OF THE INVENTION

This invention relates to a process for producing pastas such as spaghetti, macaroni, lasagne and shells or Japanese or Chinese noodles such as udon, soba, and hiyamugi, that can be prepared by boiling within short times not longer than three minutes, preferably not longer than one minute and which yet can be served to provide good palatability.

BACKGROUND OF THE INVENTION

Pastas are produced by adding water to wheat flour, kneading the mixture to prepare a dough of firm consistency and shaping the dough by extrusion through an extruder or the like under high pressure. Typically, semolina of drum, which is a hard wheat (or high gluten content) is used as a primary raw material, which is occasionally mixed with egg white, milk and other ingredients. The pastas thus produced are hard and dense. Pastas are prepared by boiling and cooking to provide such a moisture gradient that the moisture content in the center of the pasta is lower than the surface moisture content; the pastas are said to taste best when served "al dente" with a "firm" texture.

To create the "al dente" condition, the use of dry or hard pastas is preferred; however, these pastas take a long time to boil and are unsuitable for the case where convenience and speed in cooking are required.

Several methods have been attempted to serve pastas "al dente" with improved convenience and speed in cooking, and they include providing V cuts along the strings of pastas such as spaghetti or quickly freezing pastas that have been boiled "al dente". However, even the pastas with V cuts cannot be cooked as quickly and conveniently as "instant noodles". Frozen pastas have no problems with quality but because of the limitations in distribution and storage on the market, they have not become as popular as "instant noodles".

As for Japanese or Chinese noodles including udon, soba, hiyamugi and kishimen, various methods have also been proposed to accomplish the manufacture of quick boiling products. According to the known proposals, partially cooked noodles prepared by boiling raw noodles for a short time or boiled products prepared by boiling raw or dry noodles are distributed either chilled or frozen. However, these partially cooked noodles or preboiled noodles have had the problem that during the distribution, not only their palatability deteriorates but also the strings become "too tender" with the lapse of time, thereby deteriorating in texture.

Under the circumstances, it has been desired to develop quick boiling pastas that can be prepared "al dente" by boiling within a comparatively short time, say, not longer than about three minutes, preferably not longer than about one minute, optimally within about thirty seconds and that can be served conveniently, or quick boiling Japanese or Chinese noodles that can be prepared to acquire firm consistency by boiling within a comparably short time.

SUMMARY OF THE INVENTION

The present invention provides a process for the manufacture of quick boiling pastas or Japanese or Chinese noodles which comprises the steps of heating dry pastas or noodles with wet heat for a short time to convert the surface layer portion to the α-starch form, drying the surfaces of the pasta or noodle strings by either leaving them to stand or exposing them to dry heat or blowing hot air onto them and subsequently either immersing the pasta or noodle strings in water at 0–75° C. to have it absorbed, followed by cooling and packaging or packing the pasta or noodle strings into a sealable container together with water at 0–75° C. and allowing them to absorb the water. Japanese or Chinese noodles may be simply referred to as "noodles" hereinbelow. The quick boiling pastas or noodles produced by the process of the invention need only to be boiled within a short time not longer than three minutes, preferably not longer than one minute, more preferably in about 30 seconds or less in order to acquire the same "al dente" condition or the same consistency as can be attained by prolonged boiling of dry pastas or noodles.

In order to convert the surface layer portion of dry pastas or noodles (pastas and noodles are hereinafter sometimes collectively referred to as "pasta or the like"), they are heated with wet heat such as by boiling in hot water for a short time or steaming with water vapor. Then, after optional cooling by spraying with a mist or drops of water at either ambient or lower temperatures, the surface of the pasta or the like is dried and the pasta or noodle strings the surface of which has been converted to the α-starch are immersed in water to have it absorbed and the recovered pasta or the like is subsequently cooled for a short time before packaging. Alternatively, the pasta or the like, the surface of which has been converted to the α-starch form is dried on the surface and thereafter put into a sealable container such as a plastic bag together with the amount of water that is required to achieve the intended water absorption, and the container is then sealed; in this approach, the pasta or the like in the container completes the process of water absorption while it is being stored or transported.

By either approach, one can produce quick-boiling pastas or noodles that can be cooked to the "al dente" condition or a condition with firm consistency by boiling within a short time, say, not longer than three minutes, preferably not longer then one minute, more preferably in about 30 seconds.

DETAILED DESCRIPTION OF THE INVENTION

The process of the invention for producing quick-boiling cooking pasta or the like uses common dry pasta or the like as a starting material. When immersed in water, dry pastas or noodles will generally absorb water to swell over time to acquire physical properties similar to those of raw pastas or noodles; on the other hand, the swollen product will dissolve at the surface to be leached into water and the surface becomes so fragile that it will be disintegrated by a small physical force. In the present invention, the step of swelling by water absorption is preceded by a heat treatment which is effected for a short but sufficient time to form a film of α-starch on the surface of the dry pasta or the like. Because of this starch conversion, the surface of the pasta or the like will neither dissolve nor disintegrate even if it absorbs water in the subsequent water absorption swelling step and it is possible to produce pasta or the like which retains a smooth surface even after absorbing water.

Stated more specifically, the dry pastas or noodles are heated for a short but sufficient time to convert an extremely thin surface layer to the α-starch form while leaving the central portion dry. The term "conversion to the α-starch" form as used herein shall collectively mean not only pure conversion to the α-starch but also the case where the surface portions of the pasta or noodle strings are changed physically or chemically by heating and modified to such a state that those surface portions will neither dissolve nor disintegrate even if they are contacted with water in the subsequent step of water absorption.

Heating with wet heat can be effected by either immersing in hot water or steaming with water vapor. The heating temperature and time vary with the shape, size, thickness and so forth of the pasta or the like; however, any heating conditions will do insofar as the starch in the surface layer portion of the pasta or the like can be converted to the α-form. Typically, boiling may be effected in hot water at about 60–100° C., preferably about 80–100° C., for about 10 seconds to about 5 minutes, preferably for about 30 seconds to about 3 minutes. In steaming with water vapor, heating beyond 100° C. is possible by using superheated steam.

If heating is performed for an unduly short time, the pasta or the like will be heated unevenly or some areas of the surface will be left uncovered with a film of the α-starch. If the heating time is unduly long, the pasta or the like tends to be chunky and deteriorated in quality. Optimal heating conditions can be appropriately selected from the above-stated ranges in accordance with the type and shape of the pasta or the like, as well as the desired product quality.

The heating for conversion to the α-starch form may be performed to such an extent that the central portion of the pasta or the like remains dry but a thin film of α-starch will form on the surface. The pasta or the like which has been thusly converted to the α-starch only in the surface layer portion is optionally cooled by spraying with a mist or drops of water before their surface is dried. The spraying with a mist or drops of water is effective not only in cooling the pasta or the like (rough removal of heat) but also in helping the pasta separate into individual strings so that it can be handled with ease in the subsequent step.

Drying after the cooling may be performed by any method such as natural drying with the pasta or the like being left to stand, blowing of air at ambient temperature or drying with hot air. If the surface of the pasta or the like is yet to be dried, it remains sticky during processing in the subsequent step of water absorption or even after the absorption of water and this presents inconvenience in the associated processing and handling procedures. In order to eliminate this problem, the process of the invention includes the step of drying the pasta or the like to remove the surface moisture prior to the subsequent step of water absorption.

The pasta or the like which has been dried on the surface is immersed in water to have it absorbed. Alternatively, as will be described later, the pasta or the like may be put into a sealable container such as a plastic bag together with water (preferably warmed water) and allowed to absorb the water.

The heat-treated pasta or the like has a thin film of α-starch on the surface and, hence, is free from the problem of surface dissolution or disintegration even if it is contacted with water. The temperature of the water into which the pasta or the like is to be immersed varies with the product quality to be attained, the desired production time and other factors; in practice, water absorption can be completed within a short time by using water at 0–75° C., preferably warmed to 50–70° C.

The time for water absorption varies with the shape and size of the pasta or the like, as well as with the thickness of noodles or the pasta or the like in the form of noodles (e.g. spaghetti). The water temperature also affects the time for water absorption and the lower the water temperature, the longer the time that is required to complete the step of water absorption. Consider, for example, the case of allowing spaghetti (string diameter—1.7 mm) to absorb water by immersing it; the relationship between the temperature of the water (20–80° C.) and the time for water absorption is shown in the following table.

TABLE

| Relationship Between Water Temperature and Time for Water Absorption | | | | | | | |
|---|---|---|---|---|---|---|---|
| Temperature (° C.) | 20 | 30 | 40 | 50 | 60 | 70 | 80 |
| Time (min) | 45–60 | 30–50 | 20–40 | 10–25 | 8–20 | 5–12 | 5–7 |

As is clear from this table, the time for water absorption changes greatly with the temperature of water, and the higher the water temperature, the shorter the time for water absorption. However, at temperatures above 75° C., the pasta or the like becomes completely boiled and it is difficult to cook and serve it "al dente" or with a firm texture. At water temperatures below 0° C., more than an hour is necessary to complete the step of water absorption and, hence, larger equipment and a wider installation space are required for actual plant operation but this is not economically feasible. Hence, the time for water absorption can be substantially reduced by performing it at temperatures of 0–75° C., preferably 50–70° C. The temperature of the water to be absorbed is desirably determined from these ranges as appropriate for the ease of the production process, its efficiency and other factors.

The degree of water absorption is such that the moisture content of the pasta or the like is 30–70 wt % preferably 50–65 wt %. With a low moisture content, the boiling time for cooking the pasta or the like as the final product is prolonged and vice versa.

It is generally held that the "firmness" of boiled pasta or the like is developed by the difference in moisture content between the surface and central portions of each string and the "too tender" state means that the moisture content has become the same in the surface and central portions, whereby the pasta or the like is no longer "firm". If the pasta or the like has absorbed only a small amount of water as the result of water absorption, it must be boiled for a comparatively long time before it becomes ready to eat but, on the other hand, the gradient of moisture content in the surface and central portions of the as-boiled pasta or the like is steep enough to provide a firm texture and it takes much time for the cooked pasta or the like to reduce the moisture content gradient. If the pasta or the like has absorbed a large amount of water, it need be boiled for only a short time before it becomes ready to eat but, at the same time, it will shortly lose firmness.

Take the above-mentioned spaghetti as an example; it can be boiled up in about 3 minutes with 40% water absorption, about one minute with 50% absorption, about 40 seconds with 60% absorption and about 20 seconds with 65% absorption, and the "al dente" condition is attained in all cases.

According to an alternative method of implementing the step of water absorption, the pasta or the like which has been converted to α-starch on the surface and subsequently dried is packed in one or more servings into a sealable container such as a plastic bag, into which water is injected in the amount necessary to attain a specified moisture content as the result of water absorption and the container is subsequently sealed. The thus packaged pasta or the like will absorb concomitant water during subsequent storage or transport, whereby the intended process of water absorption is completed. The desired moisture content has already been discussed above. The water to be injected may have the same temperature as what is used in the above-described step of immersing and it is generally in the range of 0–75° C., preferably 50–70° C. Packaging of the pasta or the like at this stage reduces the risk of secondary bacterial contamination, thereby improving keeping quality.

The water to be absorbed by the pasta or the like may be mixed with desired seasonings, spices or food additives such as table salt, sugar, acids and alcohols in order to assure better keeping quality in the subsequent stages or for the purpose of seasoning to taste. The seasonings, spices or food additives may be dissolved or suspended in the water to be absorbed such that they can be adsorbed on or absorbed by the pasta or the like during the water absorption.

The quick boiling pasta or the like which has been produced by the steps of heating, water absorption and packaging can be stored either chilled or frozen for an extended period of time without deterioration in quality. The frozen product can be stored for a longer period than the chilled one.

The thus produced quick boiling pastas or noodles have absorbed a sufficient amount of water in their interior that is necessary to accomplish conversion to the α-starch form and, in addition, the surface layer of the α-starch is not sticky at all; hence, it can be cooked "al dente" by boiling in water for a short time not exceeding 3 minutes, preferably not longer than one minute, and can be served on a dish affording the same texture and taste as are obtained by boiling ordinary dry or raw pastas or noodles. If desired, as in the case of common pastas, it can be sautéed, mixed with ingredients such as meat, vegetable or shellfish to one's own preference, or spread with sauce.

The following examples are provided for the purpose of further illustrating the present invention but are in no way to be taken as limiting.

EXAMPLE 1

A hundred grams of dry spaghetti (1.7 mm$^\phi$) made from the semolina of durum wheat was heated in hot water at 100° C. for one minute. The recovered spaghetti was cooled by spraying with drops of water at ambient temperature for one minute. With water drained off, the spaghetti was left to stand at room temperature for 10 minutes so that its surface became dry. The spaghetti was then immersed in 1% salted hot water at 60° C. for 12 minutes to have water absorbed. As a result of the water absorption, the spaghetti weighed 185–190 g with a moisture content of 53–55%.

Even after the water absorption, the spaghetti had a smooth surface in the absence of any specks due to surface dissolution. The spaghetti was stored overnight in a refrigerator and then boiled in water for 60 seconds. The fully boiled spaghetti was "al dente" and had the desired firmness.

EXAMPLES 2 AND 3

Quick boiling spaghetti was produced as in Example 1 except that the heating and water absorption steps were performed under the conditions set forth below. The produced spaghetti was then stored in either a frozen or chilled state and boiled in water for a specified time. The results of evaluation of the boiled spaghetti are also shown below.

| Example | Heat treatment | Surface drying | Water absorption | Boil time | Surface specks | Taste |
|---|---|---|---|---|---|---|
| 2 | 80° C. | ambient temperature | 60° C. | 50 sec | none | good |
|   | 1 min and 30 sec | 10 min | 10 min | | | |
| 3 | 85° C. | hot air | 70° C. | 50 sec | none | good |
|   | 1 min and 20 sec | 3 min | 8 min | | | |

EXAMPLE 4

As in Example 1, spaghetti was converted to α-starch and dried on the surface. It was then fed into a packaging machine and packed into bags of polyethylene film, one serving (100 g as dry spaghetti) in one bag. Each bag was injected with 50 g of 0.5% salted water at 50° C. and sealed. The thus packaged spaghetti was placed in a container and stored in a refrigerator for 24 h.

The stored spaghetti was taken out of each bag and it was found to have absorbed the injected water. The moisture content of the spaghetti was in the range of 50–55%.

The spaghetti was boiled in water for 60 seconds. The fully boiled spaghetti was "al dente" and had the desired firmness.

What is claimed is:

1. A process for manufacturing quick boiling pasta or noodles comprising the steps of:
   (a) heating dry pasta or noodles for a time sufficient to convert the starch in the surface layer of the pasta or noodles to alpha-starch;
   (b) cooling the pasta or noodles;
   (c) drying the surface of the pasta or noodles followed by either immersing the pasta or noodles in water at 0–75° C. for 5–10 minutes so that the surface of the pasta or noodles absorbs water and cooling the pasta or noodles before packaging, or packaging the pasta or noodles in a sealable container together with water at 0–75° C. and allowing the pasta or noodles to absorb the water in the packing container.

2. The process according to claim 1 wherein said heating is accomplished by immersing the pasta or noodles in hot water for 10 seconds to 5 minutes.

3. The process according to claim 2 wherein said heating is effected in water at 80–100° C. for 30 seconds to 3 minutes.

4. The process according to claim 1 further comprising:
   (d) spraying the pasta or noodles with water or immersing the pasta or noodles in water at 0–35° C. for 30 seconds to cool the pasta or noodles; and
   (e) drying the surface of the pasta or noodles.

5. The process according to claim 1 wherein the surfaces of the pasta or noodles are dried by leaving the pasta or noodles in ambient air to dry, blowing air at ambient temperature onto the pasta or noodles, heating the pasta or noodles with a heater, or blowing hot air onto the pasta or noodles.

6. The process according to claim 1 further comprising:
   (d) immersing said pasta or noodles into water at 50–70° C. for 5–25 minutes so that the pasta or noodles absorb water, and
   (e) cooling said pasta or noodles at a temperature of 10° C. or less.

7. The process according to claim 1 further comprising:

(d) sealing said pasta or noodles into a package together with water whereby the pasta or noodles absorb the water within the packaging.

8. The process according to claim 7 wherein water is added to the packaging in an amount of 40–60 parts by weight of water per 100 parts by weight of pasta or noodles.

9. The process according to claim 7 wherein the water has been warmed to 50–70° C.

10. The process according to claim 7 wherein said water is warmed to 50–70° C. and put into the packaging in an amount of 40–60 parts water by weight of the pasta or noodles.

* * * * *